(12) United States Patent
Oda

(10) Patent No.: US 6,689,187 B2
(45) Date of Patent: Feb. 10, 2004

(54) TANTALUM POWDER FOR CAPACITORS

(75) Inventor: Yukio Oda, Kawanuma-gun (JP)

(73) Assignee: Cabot Supermetals K.K., Tokyo (JP)

( * ) Notice: Subject to any disclaimer, the term of this patent is extended or adjusted under 35 U.S.C. 154(b) by 0 days.

(21) Appl. No.: 09/925,975

(22) Filed: Aug. 10, 2001

(65) Prior Publication Data

US 2002/0050185 A1 May 2, 2002

(51) Int. Cl.⁷ .................................................. B22F 1/00
(52) U.S. Cl. ........................... 75/255; 75/245; 361/529
(58) Field of Search ..................... 75/255, 245; 361/529

(56) References Cited

U.S. PATENT DOCUMENTS

| | | | |
|---|---|---|---|
| 4,645,533 A | 2/1987 | Izumi | 75/0.5 AB |
| 4,740,238 A | 4/1988 | Schiele | 75/0.5 BB |
| 4,954,169 A | 9/1990 | Behrens | 75/228 |
| 4,957,541 A | 9/1990 | Tripp et al. | 75/245 |
| 5,082,491 A | 1/1992 | Rerat | 75/255 |
| 5,407,458 A | 4/1995 | König et al. | 75/255 |
| 5,560,761 A | 10/1996 | Naito | 75/255 |
| 5,605,561 A | 2/1997 | Iwabuchi et al. | 75/364 |
| 5,954,856 A * | 9/1999 | Pathare et al. | 75/255 |
| 5,986,877 A * | 11/1999 | Pathare et al. | 361/508 |
| 6,136,062 A | 10/2000 | Löffelholz et al. | 75/369 |
| 6,171,363 B1 | 1/2001 | Shekhter et al. | 75/369 |
| 6,193,779 B1 * | 2/2001 | Reichert et al. | 75/343 |
| 6,238,456 B1 * | 5/2001 | Wolf et al. | 75/245 |
| 6,479,012 B2 | 11/2002 | Rao | 419/36 |
| 6,576,038 B1 | 6/2003 | Rao | 75/255 |
| 2002/0108469 A1 | 8/2002 | Behrens | 75/770 |

FOREIGN PATENT DOCUMENTS

| | | | |
|---|---|---|---|
| JP | 58-27903 | 2/1983 | B22F/1/00 |
| JP | 63-238203 | 10/1988 | B22F/1/00 |
| JP | 2-38501 | 2/1990 | B22F/1/00 |
| JP | 8-97096 | 4/1996 | H01G/9/052 |
| WO | WO 02/34436 A1 | 5/2002 | B22F/1/00 |

* cited by examiner

*Primary Examiner*—Ngoclan Mai
(74) *Attorney, Agent, or Firm*—Kilyk & Bowersox

(57) ABSTRACT

The tantalum powder for capacitors of the present invention has a specific surface area $S_B$ as determined by the BET method of 1.3 m²/g or more, and an $S_B/S_F$ ratio between the specific surface area $S_B$ as determined by the BET method and the specific surface area $S_F$ determined by the FSS method of 4 to 10. This tantalum powder not only has a large specific surface area $S_B$, but also has suitable cohesive strength and uniform porosity.

Consequently, a solid state electrolytic capacitor having high capacitance and low ESR can be obtained by providing with a capacitor anode formed from a sintered body of this tantalum powder. In addition, whether or not this tantalum powder is suitable for the production of a tantalum capacitor having high capacitance and low ESR can be determined easily and reliably by evaluating the tantalum powder using the specific surface area $S_B$ as determined by the BET method and the $S_B/S_F$ ratio between $S_B$ and the specific surface area $S_F$ determined by the FSS method.

19 Claims, No Drawings

TANTALUM POWDER FOR CAPACITORS

BACKGROUND OF THE INVENTION

1. Field of the Invention

The present invention relates to a tantalum powder suitable for the raw material of anodes of solid state electrolytic capacitors.

2. Description of Related Art

Tantalum sintered bodies having a porosity of 70% by volume or more are used for the anodes of tantalum solid state electrolytic capacitors (to be referred to as simply tantalum capacitors). The tantalum sintered body is anodized, a film of a solid state electrolyte is formed on its surface, and after connecting a cathode terminal on that film by soldering and so forth, a resin casing is formed to obtain the tantalum capacitor.

In order to produce the tantalum sintered body, primary powder of tantalum is first obtained by a known method such as sodium reduction of potassium tantalum fluoride or hydrogen reduction of tantalum pentachloride. Next, this primary powder is then subjected to an acid-water washing step to remove miscellaneous impurities in the powder as necessary. Next, water and so forth is added to the primary powder to perform a preliminary agglomeration step to weakly agglomerate the primary powder. The preliminary agglomeration step serves to control the bulk density of thermally agglomerated powder in the next heat treatment step. Following this preliminary agglomeration step, the pre-agglomerated primary powder is heat treated at a temperature of 1000° C. and above to agglomerate the primary powder by heat treatment and obtain agglomerated particles. A deoxygenating step is then performed to remove excess oxygen from the thermally agglomerated particles.

After press molding the hard sponge-like tantalum agglomerated particles having a diameter of several ten to several hundred μm obtained in this manner, a tantalum sintered body is obtained by sintering.

By the way, accompanying the reduced size and higher frequencies of electronic equipment and electronic circuits in recent years, there has been a growing need for tantalum capacitors offering higher capacitance and lower equivalent series resistance (ESR). Capacitor capacitance is proportional to the surface area of the anode. Consequently, it is necessary to use tantalum agglomerated particles for the anode raw material that have as large a surface area as possible.

For example, tantalum agglomerated particles having a specific surface area of about 1 $m^2/g$ (0.35 μm when converted as the spherical approximate diameter) as determined by BET are used for the raw material of an anode for which the CV value indicative of capacitor capacitance is 50,000 μF·V/g (standard formation conditions: 60° C., 20 V). After press molding these agglomerated particles, the anode is produced by sintering at a temperature of about 1400° C. Other agglomerated particles have been disclosed in Japanese Unexamined Patent Application, First Publication No. 58-27903 in which the particle size as measured with the air permeability method (Fischer Subsieve Sizer: FSS method) is 1.1 to 1.8 μm (0.33 to 0.20 $m^2/g$ in terms of surface area) and the BET specific surface area as measured with the nitrogen adsorption method is 0.27 to 0.75 $m^2/g$. In addition, agglomerated particles are disclosed in Japanese Unexamined Patent Application, First Publication No.63-238203 in which the particle size as measured with the FSS method is 1.0 to 3.0 μm (0.36 to 0.12 $m^2/g$ in terms of surface area) and the BET specific surface area is about 0.4 $m^2/g$. In addition, agglomerated particles are disclosed in Japanese Unexamined Patent Application, First Publication No. 2-38501 in which the particle size as measured with the FSS method is 0.3 to 0.7 μm (1.20 to 0.52 m2/g in terms of surface area) and the BET specific surface area is 1.75 to 3.50 $m^2/g$. Furthermore, since the specific gravity of tantalum is 16.6, the relationship in which particle size as measured by the FSS method×6/(16.6×surface area as determined by FSS) exists between particle size as measured with the FSS method (μm) and surface area ($m^2/g$).

On the other hand, the ESR value of a capacitor is characterized by being related to the magnitude of heat generation accompanying increased speeds of electronic circuits such that as ESR increases, heat generation also increases. Thus, tantalum capacitors used in the CPUs and power supply circuits of personal computers are required to have a low ESR. In order to decrease ESR, it is necessary to uniformly form a solid state electrolytic coating on the tantalum sintered body. Manganese oxide is typically used for the solid state electrolytic coating. In the case of forming a solid state electrolytic coating comprised of manganese oxide, a manganese nitrate solution and so forth is impregnated into the sintered body followed by heating and thermal decomposition of the manganese nitrate. In order to uniformly form a solid state electrolytic coating on the tantalum sintered body, it is necessary to use a tantalum sintered body having uniform porosity with minimal closed pores and micropores. In addition, electrically conductive polymers have recently come to be frequently used as solid state electrolytic coatings. Since these electrically conductive polymers are composed of large molecules, it is necessary to more precisely control the porosity of the tantalum sintered body.

In order to produce such a tantalum capacitor having high capacitance and low ESR, it is important to use for the anode a tantalum sintered body having uniform porosity with minimal closed pores and micropores. In order to produce such a tantalum sintered body, it is necessary to suitably control the particle size distribution, cohesive strength and porosity of the tantalum agglomerated particles used as the raw material. For example, in order to produce an anode for a tantalum capacitor having a CV value of 50,000 μF·V/g under standard formation conditions (60° C., 20 V), it is first necessary to select a tantalum primary powder of a suitable particle size, and then subject this to preliminary agglomeration and heat treatment under appropriate conditions to obtain tantalum agglomerated particles.

However, in the case of producing a tantalum capacitor having a high capacitance in excess of 50,000 μF·V/g, a primary powder is required that has a larger surface area. Since primary powders like this have extremely high reactivity, the primary powder ends up strongly agglomerating with itself making it susceptible to the formation of agglomerated particles having high cohesive strength. Agglomerated particles having high cohesive strength are not easily broken up even when subjected to press molding. Tantalum sintered bodies obtained by press molding and sintering such agglomerated particles have large pores between a plurality of agglomerated particles, and in addition to having fine pores within each of the agglomerated particles, also have closed pores. Namely, such tantalum sintered bodies do not have uniform porosity. It is therefore difficult to uniformly form a solid state electrolytic coating on such tantalum sintered bodies. Thus, when such a tantalum sintered body is used as an anode, the resulting tantalum capacitor ends up having a large ESR.

Consequently, in Japanese Unexamined Patent Application, Primary Publication No. 8-97096, for example, a method for inhibiting excessive agglomeration by primary powder having a large surface area is proposed in which the heat treatment step is omitted, and the primary powder is thermally agglomerated in a step in which the primary powder is deoxygenated. However, this method was not effective since it is difficult to simultaneously optimize the degree of deoxygenation and the degree of thermal agglomeration.

As has been explained above, in order to produce a high-capacitance tantalum capacitor, although it is necessary to use tantalum agglomerated particles having a large surface area, there were many cases in which such agglomerated particles did not have uniform porosity due to excessively large cohesive strength. Namely, the production of tantalum agglomerated particles having a large surface area, suitable cohesive strength and uniform porosity that enabled the production of a tantalum capacitor having both high capacitance and low ESR was extremely difficult in the prior art.

SUMMARY OF THE INVENTION

The object of the present invention is to provide a tantalum powder (agglomerated particles) that allow the production of a tantalum capacitor having both high capacitance and low ESR.

The inventor of the present invention focused on the $S_B/S_F$ ratio of tantalum powder, namely the ratio between the specific surface area as determined by the BET method ($S_B$) and the specific surface area as determined by the FSS method ($S_F$), and then examined the relationship between the value of this ratio and the values of capacitor capacitance and ESR. As a result, when a tantalum powder is used in which the BET specific surface area $S_B$ is equal to or greater than a specific value and the $S_B/S_F$ ratio is within a specific range, it was found that a capacitor can be produced that has both high capacitance and low ESR, thereby leading to completion of the present invention.

The tantalum powder for capacitors of the present invention is characterized by the specific surface area as determined by the BET method $S_B$ being 1.3 m²/g or more, and the ratio $S_B/S_F$ between the specific surface area as determined by the BET method $S_B$ and the specific surface area as determined by the FSS method $S_F$ being from 4 to 10. Not only is the specific surface area $S_B$ of this tantalum powder large, but it also has suitable cohesive strength and uniform porosity. Consequently, a solid state electrolytic capacitor can be obtained having high capacitance and low ESR by providing with a capacitor anode formed from a sintered body made of this tantalum powder for capacitors.

In addition, the evaluation method of the tantalum powder for capacitors of the present invention is characterized by evaluating the tantalum powder using specific surface area as determined by the BET method ($S_B$), and the $S_B/S_F$ ratio between this $S_B$ and specific surface area as determined by the FSS method ($S_F$). The $S_B/S_F$ ratio indicates the degree of agglomeration of the tantalum powder. Accordingly, whether or not a tantalum powder is suitable for production of a capacitor having high capacitance and low ESR can be determined easily and reliably by using specific surface area as determined by the BET method ($S_B$) and the $S_B/S_F$ ratio.

DESCRIPTION OF THE PREFERRED EMBODIMENTS

The following provides a detailed explanation of the present invention.

The evaluation method of the tantalum powder for capacitors of the present invention is a method for evaluating tantalum powder that uses the specific surface area as determined by the BET method ($S_B$) and the $S_B/S_F$ ratio between $S_B$ and the specific surface area determined according to the FSS (Fischer Subsieve Sizer, or air permeability method) method ($S_F$).

In the case of evaluating a tantalum powder for capacitors, whether or not a tantalum powder is suitable as the anode raw material of a capacitor having high capacitance and low ESR can be evaluated easily and reliably by using specific surface area $S_B$ and the $S_B/S_F$ ratio as indicators.

Here, the BET method refers a method for determining the specific surface area of a particle from the monomolecular adsorption of nitrogen molecules. Nitrogen molecules also adsorb in the small pores possessed by particles. Accordingly, specific surface area $S_B$ as measured with the BET method reflects the surface area of primary particles. On the other hand, the FSS method refers to a method for determining the surface area of a particle from the amount of air that passes through a filled layer filled with particles per unit time. Accordingly, specific surface area $S_F$ as measured with the FSS method reflects the filled state and agglomerated state of primary particles. Namely, specific surface area $S_F$ differs if the particle agglomeration state is different even in the powder that specific surface area $S_B$ is the same. More specifically, tantalum powder having weak agglomeration has a large specific surface area $S_F$, while tantalum powder having strong agglomeration has a small specific surface area $S_F$. Namely, tantalum power having weak agglomeration has a small $S_B/S_F$ ratio, while tantalum powder having strong agglomeration has a large $S_B/S_F$ ratio. In this manner, the $S_B/S_F$ ratio is an indicator that represents the degree of agglomeration of tantalum powder.

In order to produce a tantalum capacitor having high capacitance and low ESR, not only is it necessary for the tantalum powder used as the anode raw material to have a large specific surface area $S_B$ as measured by the BET method, but also that it have suitable cohesive strength and pores of uniform size. When the specific surface area $S_B$ of a tantalum powder for capacitors is measured, it can be determined to a certain extent as to whether or not that tantalum powder is suitable for producing a capacitor having high capacitance. However, whether or not the tantalum powder is suitable for the production of a capacitor having low ESR cannot be determined from specific surface area $S_B$ alone. Whether or not that tantalum powder can be used to produce a capacitor having low ESR can be evaluated by determining the $S_B/S_F$ ratio between specific surface area $S_B$ as measured with the BET method and specific surface area $S_F$ as measured with the FSS method, and then using that ratio as an indicator.

The tantalum powder for capacitors of the present invention has a specific surface area $S_B$ as measured with the BET method of 1.3 m²/g or more, and an $S_B/S_F$ ratio of 4 to 10.

If specific surface area $S_B$ is less than 1.3 m²/g, a high-capacitance capacitor having a CV value of 50,000 μF·V/g or more cannot be produced. In addition, if the $S_B/S_F$ ratio is less than 4, a fine powder is formed when this tantalum powder for capacitors is press formed, causing a decrease in the fluidity of the powder or causing the pores of the powder to collapse easily. As a result, in the case of producing a tantalum sintered body by sintering a compact obtained by press molding this tantalum powder, the resulting tantalum sintered body does not have uniform porosity. On the other hand, if the $S_B/S_F$ ratio exceeds 10, the primary particles of this tantalum powder are strongly agglomerated, and it has a large number of micropores and closed pores. Accordingly, in the case of producing a tantalum sintered body using this as the raw material, the resulting tantalum sintered body has numerous micropores and closed pores.

In this manner, a tantalum sintered body in which pores are formed uniformly cannot be obtained if a tantalum powder is used for which the $S_B/S_F$ ratio is less than 4 or greater than 10. Since such a tantalum sintered body has a small effective surface area, when it is used as an anode raw material, a high-capacitance capacitor cannot be produced. In addition, a raw material solution of a solid state electrolytic coating cannot be uniformly impregnated in such a tantalum sintered body, and the impregnated raw material solution cannot be thermally decomposed uniformly. As a result, a solid state electrolytic coating cannot be formed uniformly. Accordingly, the use of such a tantalum sintered body prevents the production of a capacitor having low ESR.

In addition, if the $S_B/S_F$ ratio is within the range of 4 to 6 in the case the specific surface area $S_B$ as measured with the BET method is within the range of 1.3 to 2 m$^2$/g, the $S_B/S_F$ ratio is within the range of 6 to 8 in the case $S_B$ is within the range of 2 to 3 m$^2$/g, or if the $S_B/S_F$ ratio is 8 to 10 in the case specific surface area $S_B$ as measured with the BET method is 3 m$^2$/g or more, then a capacitor is obtained having low ESR with an even higher capacitance.

In addition, the particle size of the tantalum powder is preferably graded so as to pass through a sieve within a range of 38 to 250 μm. If the particle size is less than 38 μm, the fluidity of the tantalum powder becomes poor, and even when this tantalum powder is press formed, a compact having uniform porosity cannot be produced. As a result, there are cases in which a tantalum sintered body having uniform porosity cannot be produced. If the particle size exceeds 250 μm, the molded density of the compact obtained by press molding becomes excessively large. As a result, there are cases in which a tantalum sintered body is obtained in which sintering has progressed excessively. Since a raw material solution of a solid state electrolytic coating cannot be uniformly impregnated into such a tantalum sintered body, the capacitance yield tends to decrease.

Next, an explanation is provided of a method of producing a tantalum powder for capacitors in which the specific surface area $S_B$ as measured with the BET method is 1.3 m$^2$/g or more, and the $S_B/S_F$ ratio is 4 to 10.

To begin with, a liquid phase reduction step is performed in which a tantalum salt such as potassium tantalum fluoride is made available for use as the raw material of the tantalum powder, and this tantalum salt is reduced by reacting with a reducing agent in molten diluent salt to form a tantalum primary powder. Examples of diluent salt that can be used include potassium chloride, sodium chloride, potassium fluoride and mixtures thereof. Examples of reducing agents that can be used include alkaline metals or alkaline earth metals such as sodium, magnesium and calcium, while their hydrides can also be used, examples of which include magnesium hydride and calcium hydride. The liquid phase reduction step is normally carried out at about 800 to 900° C. This is followed by washing the resulting primary powder with acid and water as necessary. The tantalum primary powder obtained in this manner consists of weakly agglomerated particles having a particle size of about 10 μm resulting from the agglomeration of primary particles.

Subsequently, a de-agglomeration step is performed in which the primary powder is de-agglomerated into primary particles as necessary. The de-agglomeration step is preferably carried out with a medium agitating type of bead mill using highly pure ceramic beads. Alternatively, the primary powder may be de-agglomerated using a jet mill in an atmosphere containing an inert gas such as argon. The use of a jet mill enables the primary powder to be de-agglomerated to primary particles without hardly any generation of fine particles.

Next, a preliminary agglomeration step is performed in which the de-agglomerated primary particles are pre-agglomerated to produce pre-agglomerated particles. In order to pre-agglomerate the primary particles, a method may be used in which a liquid is added to the primary particles, the mixture is heated as necessary and the primary particles are pre-agglomerated using the capillary adhesive force of the liquid, or a method may be used in which the primary particles are pre-agglomerated by adding an organic binder. Of these two methods, the method in which the primary particles are pre-agglomerated by addition of a liquid is preferable. Examples of liquids used here include water, alcohol and aqueous phosphoric acid. If aqueous phosphoric acid is used, since the phosphorous acts as a sintering inhibitor, excessive sintering can be inhibited during later sintering of the tantalum powder compact. Although the most suitable amount of liquid added in the preliminary agglomeration step depends on the surface area of the tantalum primary particles, and it is almost in proportion to the same, the amount of liquid added in the preliminary agglomeration step is usually 35% by mass or less, and preferably 32% by mass or less, of the primary particles. If the amount of liquid added exceeds 35% by mass of the primary particles, the $S_B/S_F$ ratio of the tantalum powder ultimately obtained may be less than 4.

Furthermore, the de-agglomeration step and preliminary agglomeration step may be carried out simultaneously. An example of a method for carrying out the de-agglomeration step and preliminary agglomeration step simultaneously consists of placing primary powder and a liquid such as phosphoric acid in an agate-made mortar having a stirring rod installed in the container, and then mixing while de-agglomeration.

Next, a heat treatment step is carried out in which the pre-agglomerated particles obtained in the preliminary agglomeration step are heated to impart strength. Specific examples of methods for carrying out the heat treatment step include known methods such as a method in which the pre-agglomerated particles are heated at about 1200° C. under reduced pressure, and a method in which a deoxygenating agent such as magnesium is added to the pre-agglomerated particles followed by heating at about 850° C.

As a result of employing such a method, a tantalum powder for capacitors can be produced having a specific surface area $S_B$ as measured with the BET method of 1.3 m$^2$/g or more, and an $S_B/S_F$ ratio of 4 to 10. Furthermore, in the case of omitting the de-agglomeration step, it is preferable to make the amount of liquid added in the preliminary agglomeration step to be 27% by mass or less of the primary particles. If liquid is added at greater than 27% by mass without carrying out the de-agglomeration step, the $S_B/S_F$ ratio of the tantalum powder ultimately obtained tends to be less than 4. In this manner, in the case of using a tantalum salt for the raw material of tantalum powder, a tantalum powder can be produced having an $S_B/S_F$ ratio of 4 to 10 by suitably controlling the amount of liquid added in the preliminary agglomeration step corresponding to the presence or absence of a de-agglomeration step.

In the case of using a tantalum chloride such as tantalum pentachloride for the raw material of the tantalum powder, a vapor phase reduction step is carried out in which this tantalum chloride is reduced with hydrogen to form the tantalum primary powder. A tantalum primary powder obtained in this manner consists of highly active fine particles that is non-cohesive on the sub-micron order.

Since a large amount of hydrogen and hydrogen chloride adsorbs to the surface of the primary powder obtained in this manner, the primary powder is heated to 500 to 1000° C. to remove the hydrogen and hydrogen chloride. In the case the primary powder has agglomerated due to this heating, it is preferable to carry out a de-agglomeration step in which the agglomerated primary powder is de-agglomerated to primary particles with a bead mill.

Next, a preliminary agglomeration step is carried out in which pre-agglomerated particles are produced by pre-agglomerating the primary particles. As was previously mentioned, a preferable method for pre-agglomerating the primary particles consists of adding a liquid to the primary particles, heating as necessary and then using the capillary adhesive force of the liquid to agglomerate the primary particles.

Next, a heat treatment step is carried out in which the pre-agglomerated particles are heated to impart strength. As was previously mentioned, a preferable method used for this heat treatment step consists of heating the pre-agglomerated particles under reduced pressure.

In the case of using a tantalum chloride for the raw material of the tantalum powder, the heat treatment step is preferably carried out at a 850 to 950° C. if the amount of liquid added in the preliminary agglomeration step is 40% by mass or more of the primary powder. If the temperature is below 850° C., the $S_B/S_F$ ratio of the tantalum powder that is ultimately obtained tends to be less than 4, while if the temperature exceeds 950° C., the $S_B/S_F$ ratio of the tantalum powder ultimately obtained tends to exceed 10. On the other hand, if the amount of liquid added is less than 40% by mass, the heat treatment step is preferably carried out at 600° C. or lower. If the temperature exceeds 600° C., the $S_B/S_F$ ratio of the tantalum powder ultimately obtained tends to exceed 10. In this manner, in the case of using a tantalum chloride for the raw material of the tantalum powder, a tantalum powder can be produced that has an $S_B/S_F$ ratio of 4 to 10 by controlling the temperature of the heat treatment step according to the amount of liquid added in the preliminary agglomeration step.

A tantalum sintered body can be produced by adding about 3 to 5% by mass of camphor ($C_{10}H_{16}O$), etc. as binder to the tantalum powder obtained in the above manner, press molding and then sintering by heating for about 0.3 to 1 hour at 1000 to 1400° C.

In the case of using this tantalum sintered body as an anode, a lead wire is embedded in the powder prior to press molding the tantalum powder followed by press molding and sintering to integrate the lead wire into the powder. This is then treated for 1 to 3 hours by, for example, raising the voltage to 20 to 60 V at a current density of 40 to 80 mA/g in an electrolyte solution of phosphoric acid, nitric acid and so forth at a temperature of 30 to 90° C. and concentration of about 0.1% by mass, to carry out anodic oxidation and obtain an anode for a tantalum capacitor.

Moreover, a tantalum capacitor is then obtained in accordance with known methods by sequentially forming a solid state electrolyte coating such as manganese oxide, lead oxide or an electrically conductive polymer, graphite layer and silver paste layer on a tantalum sintered body, connecting a cathode terminal on the tantalum sintered body by soldering, and then forming a resin casing.

A tantalum capacitor obtained in this manner is a high-performance capacitor having high capacitance and low ESR.

EMBODIMENTS

Embodiments 1-5 and Comparative Examples 1-5

A liquid phase reduction step was carried out in which potassium tantalum fluoride was reduced in diluent salt at 850° C. to form tantalum, after which it was washed with acid and water to obtain weakly agglomerated particles (primary powder) having a specific surface area $S_B$ as determined by the BET method of 1.6 m²/g and an average particle size of 13 μm comprised of the agglomeration of primary particles having a particle size of 0.3 μm. Sodium was used for the reducing agent. This primary powder was divided into two portions, one of which was placed in a stainless steel container followed carrying out a preliminary agglomeration step in which aqueous phosphoric acid was added in the respective amounts shown in Table 1 at concentrations such that the amount of phosphorous was 50 ppm relative to the tantalum while stirring gently with a spatula (Embodiment 1 and Comparative Example 1–5). The other portion was subjected simultaneously to a de-agglomeration step and preliminary agglomeration step in which the primary powder was placed in a agate-made mortar having an agate container and stirring rod followed by de-agglomerating the tantalum primary powder and mixing while adding a small amount of aqueous phosphoric acid at a time to pre-agglomerate to the prescribed size and obtain pre-agglomerated particles (Embodiments 2–5). In addition, ethanol was added with the aqueous phosphoric acid in Comparative Example 4. In addition, polyethylene glycol was added at 0.1% by mass relative to the tantalum as water reducing agent in Embodiment 1, Embodiment 5 and Comparative Example 5.

The pre-agglomerated particles obtained in this manner were subjected to a heat treatment step by heating in a high vacuum oven for 30 minutes at 1200° C. Subsequently, the contents were removed from the oven and those that had solidified were crushed with a coarse crusher and intermediate crusher followed by collection of particles having a particle size between 38 and 250 μm with a sieve. Moreover, magnesium was added to these particles followed by deoxygenation treatment at 850° C. in a vacuum oven to obtain tantalum powder.

The values of $S_B$, $S_F$ and $S_B/S_F$ of this tantalum powder are shown in Table 1.

Next, compacts obtained by molding this tantalum powder into pellets (diameter: 3.0 mm, density: 4.5 g/cm³) were sintered at 1300° C. and the resulting sintered bodies were subjected to anodic oxidation treatment under standard formation conditions ($V_f$=20 V, 90° C., 120 minutes, 10% by volume aqueous phosphoric acid solution) to obtain capacitor anodes. The capacitance (CV value; μF·V/g) and dielectric loss (tanσ) of the anodes were measured. These measurements were performed under wet conditions (bias voltage: 1.5 V, 120Hz, 30.5% by volume aqueous sulfuric acid solution).

The measurement of tanσ was substitute for the measurement of ESR. The smaller the dielectric loss (tanσ), the lower the ESR. Furthermore, the density of the sintered bodies was taken to be 5.0 g/cm³. Those results are shown in Table 1.

TABLE 1

| | De-agglom-eration step | Amt. of phosphoric acid soln. added (% by mass) | $S_B$ (m²/g) | $S_F$ (m²/g) | $S_B/S_F$ | CV (μFV/g) | tanσ (%) |
|---|---|---|---|---|---|---|---|
| Emb. 1 | Absent | 26 | 1.43 | 0.31 | 4.7 | 79,000 | 28.0 |
| Emb. 2 | Present | 32 | 1.45 | 0.28 | 5.1 | 79,200 | 25.2 |
| Emb. 3 | Present | 28 | 1.43 | 0.28 | 5.2 | 78,800 | 26.0 |
| Emb. 4 | Present | 24 | 1.45 | 0.27 | 5.3 | 79,500 | 27.8 |
| Emb. 5 | Present | 20 | 1.43 | 0.26 | 5.5 | 78,900 | 29.0 |
| Comp. Ex. 1 | Absent | 45 | 1.45 | 0.48 | 3.0 | 78,000 | 33.0 |
| Comp. Ex. 2 | Absent | 35 | 1.44 | 0.42 | 3.4 | 78,500 | 32.8 |
| Comp. Ex. 3 | Absent | 30 | 1.44 | 0.40 | 3.6 | 78,000 | 31.1 |
| Comp. Ex. 4 | Absent | 20 + EtOH 30 | 1.47 | 0.50 | 2.9 | 78,500 | 30.5 |
| Comp. Ex. 5 | Absent | 28 | 1.43 | 0.38 | 3.8 | 79,200 | 30.9 |
| | Primary powder | | 1.60 | 0.63 | 2.5 | — | — |

As shown in Table 1, when tantalum powder was used for which $S_B/S_F$ is from 4 to 10, anodes were able to be produced having large capacitance (CV value) of 78,800 μF·V/g or more, and small tanσ of 29 or less. In contrast, when tantalum powder was used for which $S_B/S_F$ is less than 4, although the resulting anodes demonstrated high capacitance (CV value) of 78,000 μF·V/g or more, tanσ was also large at 30 or more resulting in large dielectric loss.

On the basis of these results, it was suggested that the use of tantalum powder for which $S_B/S_F$ is from 4 to 10 allows the production of capacitors having high capacitance and low ESR.

Embodiments 6–10 and Comparative Examples 6–9

Highly pure tantalum pentachloride (having a total impurity content as metals of less than 100 ppm) was injected into a plasma CVD apparatus along with argon gas as the carrier gas to carry out a vapor phase reduction step to reduce the tantalum pentachloride with hydrogen gas and obtain tantalum primary powder in which the specific surface area $S_B$ as determined with the BET method was 5 m²/g (primary particle diameter of 0.07 μm when converted as the spherical diameter). Since this primary powder adsorbs a large amount of hydrogen chloride gas, the primary powder was heated to 500° C. in the presence of a flowing mixed gas of argon and hydrogen to reduce the amount of hydrogen chloride to 100 ppm or less. Since the primary powder agglomerated at this time, it was placed in alcohol to prepare a slurry after which a de-agglomeration step was carried out in which the slurry was placed in a bead mill filled with 1 mm zirconia beads to de-agglomerate the agglomerated particles to primary particles. This de-agglomeration step was omitted in Embodiment 6, Embodiment 7 and Comparative Example 6.

Next, the slurry was spray-dried to prepare non-cohesive tantalum primary particles. Next, a preliminary agglomeration step, in which pre-agglomerated particles were produced by pre-agglomerating the primary particles, and a heat treatment step that imparted strength to the pre-agglomerated particles, were carried out. The amounts of phosphoric acid solution added in the preliminary agglomeration step are shown in Table 2. Phosphoric acid solution was respectively added to a concentration of 50 ppm of phosphorous relative to the tantalum. In addition, the temperatures of the heat treatment step are as shown in Table 2.

In addition, polyethylene glycol was added at 0.1% by volume to relative to the tantalum as water reducing agent in Embodiment 10 and Comparative Examples 6, 7, 8 and 9.

Subsequently, the contents were removed from the oven and those that had solidified were crushed with a coarse crusher and intermediate crusher followed by collection of particles having a particle size between 38 and 250 μm with a sieve to obtain tantalum powder.

The values of $S_B$, $S_F$ and $S_B/S_F$ of this tantalum powder are shown in Table 2.

Next, compacts obtained by molding this tantalum powder into pellets (diameter: 3.0 mm, density: 4.5 g/cm³) were sintered at 1250° C. for 0.5 hours and the resulting sintered bodies were subjected to anodic oxidation treatment under the same conditions as Embodiment 1 to obtain capacitor anodes. The capacitance (CV value: μF·V/g) and dielectric loss (tanσ) of the anodes were measured. Furthermore, the density of the sintered bodies was taken to be 5.0 g/cm³. Those results are shown in Table 2. Furthermore, the oxygen concentration of the tantalum powder was on the order of 10000 ppm despite having omitted the magnesium deoxygenation step. The reason for this is assumed to be that the adsorbed hydrogen gas acted to inhibit increases in oxygen during the heat treatment step.

TABLE 2

| | De-agglom-eration step | Amt. Of phosphoric acid soln. added (% by mass) | Heat treatment step (° C.) | $S_B$ (m²/g) | $S_F$ (m²/g) | $S_B/S_F$ | CV (μFV/g) | tanσ (%) |
|---|---|---|---|---|---|---|---|---|
| Emb. 6 | Absent | 50 | 900 | 4.3 | 0.52 | 8.3 | 160,000 | 35.0 |
| Emb. 7 | Absent | 45 | 900 | 4.4 | 0.51 | 8.6 | 159,200 | 33.5 |
| Emb. 8 | Present | 50 | 900 | 4.2 | 0.50 | 8.4 | 155,000 | 35.5 |
| Emb. 9 | Present | 40 | 900 | 4.2 | 0.48 | 8.8 | 161,000 | 34.5 |
| Emb. 10 | Present | 33 | 500 | 4.7 | 0.55 | 8.5 | 158,900 | 37.5 |
| Comp. Ex. 6 | Absent | 40 | 1000 | 4.2 | 0.38 | 11.0 | 130,000 | 41.0 |
| Comp. Ex. 7 | Present | 37 | 900 | 4.2 | 0.40 | 10.5 | 140,500 | 41.5 |
| Comp. Ex. 8 | Present | 33 | 900 | 4.1 | 0.35 | 11.7 | 138,000 | 42.0 |
| Comp. Ex. 9 | Present | 33 | 700 | 4.5 | 0.41 | 11.0 | 130,800 | 41.5 |

As shown in Table 2, when tantalum powder was used for which $S_B/S_F$ is from 4 to 10, anodes were able to be produced having large capacitance (CV value) and small tanσ. In contrast, when tantalum powder was used for which $S_B/S_F$ exceeded 10, in addition to having low capacitance (CV value), tanσ was also large.

On the basis of these results, it was suggested that the use of tantalum powder for which $S_B/S_F$ is from 4 to 10 allows the production of capacitors having high capacitance and low ESR.

What is claimed is:

1. Tantalum powder for capacitors characterized in that, a specific surface area SB as determined by the BET method of the powder is 1.3 to 2 m², and an $S_B/S_F$ ratio of the powder between the specific surface area $S_B$ as determined by the BET method and a specific surface area $S_F$ determined by the FSS method is from 4 to 6; or a specific surface area $S_B$ as determined by the BET method of the powder is 2 to 3 m²/g, and an $S_B/S_F$ ratio of the powder between the specific surface area $S^B$ as determined by the BET method and a specific surface area SF determined by the FSS method is from 6 to 8.

2. A capacitor anode formed from a sintered body obtained by sintering the tantalum powder for capacitors according to claim 1.

3. A tantalum solid state electrolytic capacitor having the capacitor anode according to claim 2.

4. The tantalum powder of claim 1, wherein said powder has a particle size within the range 38 to 250 microns.

5. A sintered body comprising the tantalum powder of claim 1.

6. The sintered body of claim 5, wherein sintered body has uniform porosity.

7. The tantalum solid state electrolytic capacitor of claim 3, wherein said electro capacitor has a capacitance of 50,000 μFV/g or higher.

8. The tantalum solid state electrolytic capacitor of claim 7, wherein said capacitance is 78,000 μFV/g or higher.

9. The tantalum solid state electrolytic capacitor of claim 8, wherein said capacitor has a tanσ of 29 or less.

10. The tantalum powder of claim 1, which after sintering at a temperature 1300° C. and forming at 20 volts has a specific charge of 50,000 μFV/g or higher.

11. The tantalum powder of claim 1, which after sintering at a temperature 1300° C. and forming at 20 volts has a specific charge of 78,000 μFV/g or higher.

12. The tantalum powder of claim 1, which after sintering at a temperature 1300° C. and forming at 20 volts has a specific charge of 78,000 to 161,000 μFV/g.

13. The tantalum powder of claim 12, wherein said tantalum powder has a tanσ of 37.5 or lower.

14. The tantalum powder of claim 12, wherein said tantalum powder has a tanσ of from 33.5 to 37.5.

15. The tantalum solid state electrolytic capacitor of claim 3, wherein said electrolytic capacitor has a capacitance of 78,000 to 161,000 μFV/g when said tantalum powder is sintered at 1250° C. for 0.5 hours with a formation voltage of 20 volts.

16. The sintered body of claim 5, wherein said sintered body has a density of 5.0 g/cm³.

17. The tantalum powder of claim 1, wherein said tantalum powder has a primary article shape that is spherical.

18. The tantalum powder of claim 1, wherein said tantalum powder further comprises phosphorous or oxygen or both.

19. The tantalum powder of claim 10, wherein said tantalum powder has a tanσ of 29 or less.

* * * * *